(12) United States Patent  (10) Patent No.: US 12,631,821 B2
Pelc et al.  (45) Date of Patent: May 19, 2026

(54) PHOTONIC PASSIVE DELAY LINES WITH REDUCED PARASITIC LOSSES

(71) Applicant: Apple Inc., Cupertino, CA (US)

(72) Inventors: Jason S. Pelc, Sunnyvale, CA (US); Yu Miao, Sunnyvale, CA (US); Mark A. Arbore, Los Altos, CA (US); Meng Huang, Fremont, CA (US); Zhechao Wang, San Jose, CA (US)

(73) Assignee: APPLE, INC., Cupertino, CA (US)

( * ) Notice: Subject to any disclaimer, the term of this patent is extended or adjusted under 35 U.S.C. 154(b) by 464 days.

(21) Appl. No.: 18/234,562

(22) Filed: Aug. 16, 2023

(65) Prior Publication Data

US 2024/0094468 A1   Mar. 21, 2024

Related U.S. Application Data

(60) Provisional application No. 63/408,000, filed on Sep. 19, 2022.

(51) Int. Cl.
   *G02B 6/125*      (2006.01)
   *G02B 6/122*      (2006.01)
(52) U.S. Cl.
   CPC ........... *G02B 6/125* (2013.01); *G02B 6/1228* (2013.01)
(58) Field of Classification Search
   CPC ...... G02B 6/125; G02B 6/126; G02B 6/1228; G02B 2006/12119
   USPC ........................................ 385/14, 28, 30, 32
   See application file for complete search history.

(56) References Cited

U.S. PATENT DOCUMENTS

| | | | |
|---|---|---|---|
| 6,731,828 B2 | 5/2004 | Kitou et al. | |
| 7,133,584 B2 * | 11/2006 | Dawes ................ | H01S 3/06704 |
| | | | 385/129 |
| 8,634,684 B2 * | 1/2014 | Little ..................... | G02B 6/125 |
| | | | 385/32 |
| 9,170,438 B2 * | 10/2015 | Evans ..................... | G02F 1/025 |
| 9,711,930 B2 * | 7/2017 | Pitwon .................. | H01S 3/0906 |
| 10,663,662 B1 | 5/2020 | Gehl et al. | |
| 11,442,226 B2 * | 9/2022 | Feshali ................ | G01C 19/722 |
| 11,506,919 B2 * | 11/2022 | Cherchi ................ | G02F 1/0955 |
| 11,789,205 B1 * | 10/2023 | Bonneau ................ | G02B 6/262 |
| | | | 385/32 |
| 2015/0049998 A1 * | 2/2015 | Dumais .................... | G02B 6/04 |
| | | | 385/115 |

FOREIGN PATENT DOCUMENTS

| | | | | |
|---|---|---|---|---|
| CN | 110596813 | 12/2019 | | |
| WO | WO 2023/272690 A1 * | 5/2023 | ............... | G02B 6/28 |

* cited by examiner

*Primary Examiner* — Robert Tavlykaev

(74) *Attorney, Agent, or Firm* — Brownstein Hyatt Farber Schreck, LLP

(57)   ABSTRACT

Various embodiments disclosed herein describe photonic passive delay lines that have a waveguide wound into a plurality of straight segments and bends. The photonic passive delay lines are configured to reduce losses from parasitic modes of light generated at the bends. Embodiments of the photonic passive delay lines vary the dimensions of the straight segments to provide different amounts of dephasing between a mode of input light received by the photonic passive delay line and one or more parasitic modes.

20 Claims, 7 Drawing Sheets

PHOTONIC PASSIVE DELAY LINES WITH REDUCED PARASITIC LOSSES

CROSS-REFERENCE TO RELATED APPLICATION

This application is a nonprovisional and claims the benefit under 35 U.S.C. § 119(e) of U.S. Provisional Patent Application No. 63/408,000, filed Sep. 19, 2022, the contents of which are incorporated herein by reference as if fully disclosed herein.

FIELD

The described embodiments relate generally to photonic passive delay lines. More particularly, the described embodiments describe photonic passive delay lines with distributed dephasing of parasitic modes across a range of input wavelengths.

BACKGROUND

Photonic passive delay lines are used in photonic integrated circuits to passively introduce a phase delay into light carried by a waveguide. This phase delay may be used for a variety of photonics applications such as beam steering, optical communication networks, or the like. Because the length of a waveguide needed to passively introduce a given phase delay may be long (e.g., on the order of centimeters) relative to the size of the photonic integrated circuits incorporating the waveguide, many passive delay lines include a waveguide that is formed into a spiral in order to obtain a given length in a compact form factor. As the waveguide bends to form the spiral, however, this introduces higher order modes and causes polarization rotation of light passing through these bends, thereby resulting in parasitic losses. Thus, photonic passive delay lines with reduced parasitic losses may be desirable.

SUMMARY

Described herein are photonic passive delay lines configured to reduce parasitic losses across a range of target wavelengths. Some embodiments are directed to a photonic integrated circuit that includes a photonic passive delay line configured to receive input light having an input mode and an input wavelength within a target wavelength range. The photonic passive delay line includes a waveguide that defines an input segment, an output segment, a plurality of bends positioned between the input segment and the output segment along a length of the waveguide, and a plurality of straight segments positioned between the input segment and the output segment along the length of the waveguide. Each straight segment of the plurality of straight segments is positioned between a corresponding pair of bends of the plurality of bends and includes a first set of regions having a first aggregate length and a first waveguide width, and a second set of regions having a second aggregate length and a second waveguide width larger than the first waveguide width. In these variations, the first aggregate length of each straight segment of the plurality of straight segments is different.

In some variations, the waveguide includes a turn that changes a winding direction of the waveguide and is positioned between input segment and the output segment along the length of the waveguide, and the plurality of straight segments is positioned between the input segment and the turn. In other variations, for each straight segment of the plurality of straight segments, the first set of regions includes a first end region connected to a first corresponding bend and a second end region connected to a second corresponding bend immediately adjacent the first corresponding bend. Additionally, for each straight segment of the plurality of straight segments, the second set of regions includes an intermediate region positioned between the first end region and the second end region along the length of the waveguide.

Additionally or alternatively, the first waveguide width is less than 2 microns, and the second waveguide width is greater than 2 microns. The plurality of straight segments may be configured such that, for each wavelength within the target range of wavelengths and a parasitic mode, at least one pair of immediately adjacent straight segments of the plurality of straight segments has a first aggregate length change that is greater than 0.4 effective dephasing lengths. In some of these variations, the target range of wavelengths spans at least 500 nanometers. Additionally or alternatively, the input mode has a first polarization direction, and the parasitic mode has a second polarization direction perpendicular to the first polarization direction.

Other embodiments are directed to an optical system that includes a light source unit and a photonic integrated circuit comprising a photonic passive delay line. The light source unit is configured to generate output light at a set of wavelengths in a target wavelength range, where the set of wavelengths includes a maximum wavelength of the target wavelength range and a minimum wavelength of the target wavelength range. The photonic passive delay line is optically connected to the optical light source unit to receive the output light as input light having an input mode, and includes a waveguide. The waveguide defines an input segment, an output segment, a plurality of bends positioned between the input segment and the output segment along a length of the waveguide, and a plurality of straight segments. The plurality of straight segments is positioned between the input segment and the output segment along the length of the waveguide such that each straight segment of the plurality of straight segments is positioned between a corresponding pair of bends of the plurality of bends. The plurality of straight segments is configured such that, for each wavelength in the set of wavelength, the plurality of straight segments has a distribution of effective dephasing lengths for a parasitic mode that spans at least 0.3 effective dephasing lengths.

In some of these variations, the light source unit is integrated into the photonic integrated circuit. Additionally or alternatively, the input mode has a first polarization direction, and the parasitic mode has a second polarization direction perpendicular to the first polarization direction. The maximum wavelength and the minimum wavelength may span at least 500 nanometers. In some of these variations, the maximum wavelength and the minimum wavelength span at least 1000 nanometers. In other variations, each straight segment of the plurality of straight segments includes a first set of regions having a first waveguide width, and a second set of regions having a second waveguide width larger than the first waveguide width. In some of these variations, the first waveguide width is less than 2 microns, and the second waveguide width is greater than 2 microns.

Still other embodiments are directed to a photonic integrated circuit that includes a photonic passive delay line configured to receive input light having an input mode and an input wavelength within a target wavelength range. The photonic passive delay line includes a waveguide that includes an input segment, an output segment, a plurality of bends positioned between the input segment and the output segment along a length of the waveguide, and a plurality of straight segments. The plurality of straight segments is positioned between the input segment and the output segment along the length of the waveguide such that each straight segment of the plurality of straight segments is positioned between a corresponding pair of bends of the plurality of bends. The plurality of straight segments is configured such that, for each wavelength within the target range of wavelengths and a parasitic mode, at least one pair of immediately adjacent straight segments of the plurality of straight segments has an effective dephasing length change that is greater than 0.4 effective dephasing lengths.

In some of these variations, the target range of wavelengths spans at least 500 nanometers. In some of these variations, the target range of wavelengths spans at least 1000 nanometers. Additionally or alternatively, the input mode has a first polarization direction, and the parasitic mode has a second polarization direction perpendicular to the first polarization direction. The waveguide includes a turn segment that changes a winding direction of the waveguide and is positioned between the input segment and the output segment along the length of the waveguide.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
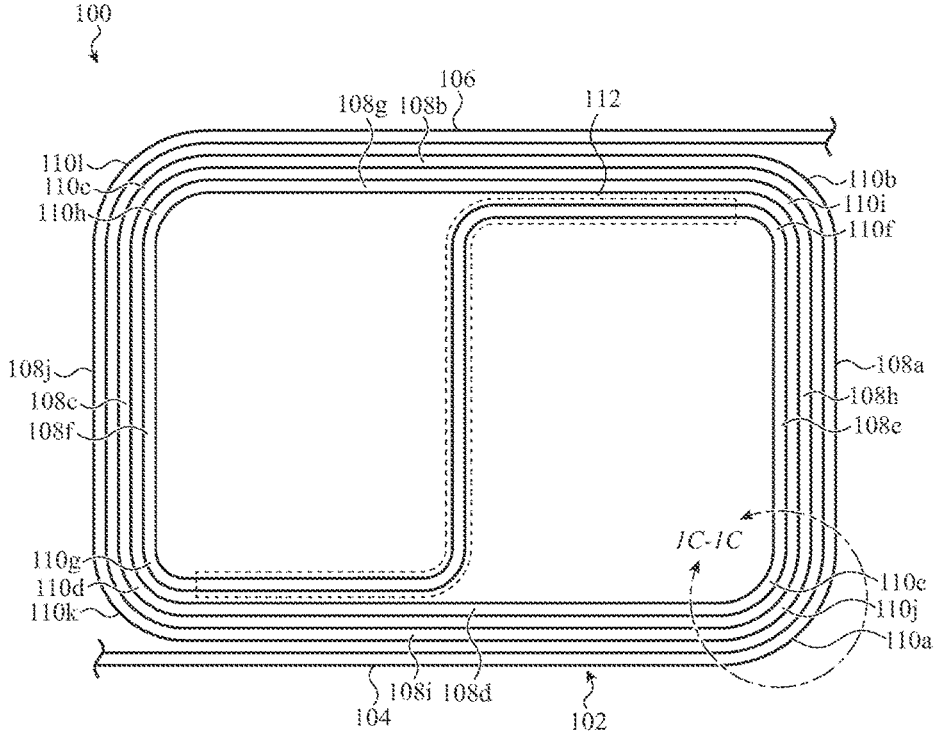
FIG. 1A is a top view of an example photonic passive delay line.

It should be understood that the proportions and dimensions (either relative or absolute) of the various features and elements (and collections and subsettings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top", "bottom", "upper", "lower", "front", "back", "over", "under", "above", "below", "left", "right", "vertical", "horizontal", etc. is used with reference some of the components in some of the figures described below, and is not intended to be limiting as to overall orientation of a given component. Because components in various embodiments can be positioned in a number of different orientations, directional terminology is used for purposes of illustration only. For example, a "top surface" of a first component need not have any particular relative orientation to a "top surface" of a different component or of a device incorporating the first component unless one is specified. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to embodiments of passive photonic delay lines. The photonic passive delay lines have waveguides wound into a plurality of straight segments and bends. The photonic passive delay lines are configured to reduce losses from parasitic modes of light generated at the bends. Embodiments of the photonic passive delay lines are configured to have distributed dephasing by varying the dimensions of the straight segments to provide different amounts of dephasing between input light having a first mode that is received by the photonic passive delay line and one or more parasitic modes that may be generated in the photonic passive delay line.

These and other embodiments are discussed with reference to FIGS. 1A-5B. However, those skilled in the art will readily appreciate that the detailed description given herein with respect to these figures is for explanatory purposes only and should not be construed as limiting.

The photonic passive delay lines described herein may be formed from a waveguide defined in a photonic integrated circuit. The photonic integrated circuit may include a substrate and a cladding layer supported on a top surface of the substrate (either directly or via one or more intervening layers). The waveguide is positioned on the cladding layer such that a bottom surface of the waveguide is positioned on a top surface of the cladding layer. In some variations, one or more additional surfaces of the waveguide are covered with an additional cladding layer, which may help provide optical confinement to light traveling through the waveguide. These layers may be formed from any suitable materials depending on the target wavelength or wavelengths of light that will be carried by the waveguide. For example, in some variations, the photonic integrated circuit is configured to carry infrared light. In one non-limiting example, the waveguide is formed from silicon, silicon nitride, silica, or the like, the cladding layer or layers is formed from one or more dielectric materials such as silicon dioxide, and the substrate is formed from silicon.

Additionally, the photonic integrated circuit receives or is capable of generating light that is carried by the waveguide. For example, the photonic integrated circuit may be part of an optical system that includes a light source unit capable of generating the light that is introduced into the photonic passive delay lines described herein. The light source unit may be integrated into the same photonic integrated circuit as the photonic passive delay line or may be separate from the photonic integrated circuit and couple light into the photonic integrated circuit (e.g., as part of a larger optical system that includes the photonic integrated circuit). The light source unit includes a set of light sources (not shown), each of which is selectively operable to emit light at a corresponding set of wavelengths. The light source unit is optically coupled to the waveguide such that light generated by the light source unit is capable of being carried by the waveguide (and thus the photonic passive delay line). It should be appreciated that the light source unit may be coupled to the waveguide via one or more intervening components (e.g., optical switches, variable optical attenuators, multiplexers, combinations thereof, and the like), such that light generated from the light source unit may be modified before it reaches the photonic passive delay line. Furthermore, these intervening components may be designed and controlled such that certain wavelengths of light generated by the light source don't reach the photonic passive delay line, or only reach the photonic passive delay line under certain circumstances (e.g., when an optical switch is activated to route light of those wavelengths to the photonic passive delay line).

Each light source of the light source unit may be any component capable of generating light at one or more particular wavelengths, such as a light-emitting diode or a laser. A laser may include a semiconductor laser, such as a laser diode (e.g., a distributed Bragg reflector laser, a distributed feedback laser, an external cavity laser), a quantum cascade laser, or the like. A given light source may be single-frequency (fixed wavelength) or may be tunable to selectively generate one of multiple wavelengths (i.e., the light source may be controlled to output different wavelengths at different times). The set of light sources may include any suitable combination of light sources, and collectively may be operated to generate light at any of a plurality of different wavelengths.

To the extent the light source unit is capable of generating multiple different wavelengths, the light source unit may be configured to generate different wavelengths of light simultaneously and/or sequentially. Accordingly, when the photonic passive delay lines are discussed as being designed to operate over a range of wavelengths (e.g., a "target range of wavelengths"), it should be appreciated that the photonic passive delay line may simultaneously receive multiple wavelengths of light within the range, or may receive different wavelengths (or combinations of wavelengths) within the range at different times. It should also be appreciated that, in some instances, the photonic passive delay line may be designed to accommodate a range of wavelengths, but in practice may only receive a subset of wavelengths within this range. For example, the light source unit need not be able to generate the entire spectrum within that range (e.g., every wavelength between the longest and shortest wavelength of the range), and in some instances may instead only generate a discrete number or set of wavelengths within the range. For the purpose of this application, a light source unit that is configured to generate light across a particular range of wavelengths is capable of generating at least two wavelengths of light (i.e., the longest and shortest wavelengths of the range). The light source may further be capable of generating any number of additional wavelengths within the range as may be desired.

FIG. 1A shows an example of a photonic passive delay line 100 that does not include the distributed dephasing features described herein. As shown there, the photonic passive delay line is formed from a length of waveguide 102. Specifically, the waveguide 102 includes an input segment 104 and an output segment 106. Light received at the input segment 104 (e.g., by a light source unit as described above) will be carried through the waveguide 102 to the output segment 106, and vice versa. Between the input segment 104 and the output segment 106, the waveguide 102 is wound into a spiral having a plurality of straight segments 108a-108j and a plurality of bends 110a-1101 (each formed by a corresponding portion of the waveguide 102). The variation shown in FIG. 1A includes ten straight segments 108a-108j and twelve bends 110a-1101, though it should be appreciated that the photonic passive delay line 100 may include any suitable number of bends and straight segments depending on the length of the waveguide 102 and the overall area into which the waveguide 102 is wound.

For ease of discussion, "immediately adjacent straight segments" of a photonic passive delay line are pairs of straight segments that are separated, along the length of the waveguide, by a single intervening bend. Similarly, "immediately adjacent bends" of a photonic passive delay line are pairs of bends that are separated, along the length of the waveguide, by a single intervening straight segment. Accordingly, in the variation of the photonic passive delay line 100 shown in FIG. 1A, the first bend 110a and the second bend 110b are immediately adjacent bends, and light travelling within waveguide 102 will travel from the first bend 110a to the first straight segment 108a, and from the first straight segment 108a to the second bend 110b (or vice versa). While the first bend 110a is positioned next to the tenth bend 110j and is physically closer to the tenth bend 110j than it is to the second bend 110b, the first bend 110a and the tenth bend 110j are not considered to be immediately adjacent for the purpose of this application.

In the middle of the photonic passive delay line 100 is a turn segment 112 that allows the waveguide to change direction. The photonic passive delay line winds counterclockwise between the input segment 104 and the turn segment 112 (via a first set of the bends and straight segments) and winds clockwise between the turn segment 112 and the output segment 106 (via a first set of the bends and straight segments), though it should be appreciated that the direction of winding may be reversed. Specifically, in the variation shown in FIG. 1A, the first through fifth straight segments 108a-108e and the first through sixth bends 110a-110f (collectively forming the first set of bends and straight segments) connect the input segment 104 to the turn segment 112 along the length of the waveguide 102. Similarly, the sixth through tenth straight segments 108f-108j and the seventh through twelfth bends 110g-110l (collectively forming the second set of bends and straight segments) connect the turn segment 112 to the output segment 106 along the length of the waveguide. The photonic passive delay lines described herein may include a range of possible configurations for the turn segment 112, some of which will be described below with respect to FIGS. 5A and 5B.

By winding the waveguide 102 into a spiral, the photonic passive delay line 100 can effectively compress the waveguide 102 into a relatively small form factor. As a non-limiting example, depending on the dimensions and numbers of the straight segments 108 and bends 110, the photonic passive delay line 100 may fit multiple centimeters of waveguide length into an area less than 1 mm^2. In some instances, the overall size and layout of a photonics integrated circuit may be such that it is impractical or undesirable to configure a given length of waveguide (such as multiple centimeters in length) as a single straight segment. Accordingly, a photonic passive delay line 100 may be a desirable alternative to a single straight waveguide segment, especially in instances where a photonic integrated circuit has multiple such waveguides.

The bends 110a-110l in the photonic passive delay line 100 may be a source of loss in the photonic passive delay line 100, as light may undesirably couple between modes and/or polarization state within a bend. For example, if light of a first mode and a first polarization (e.g., TE00), referred to herein as the "input mode," is introduced into the photonic passive delay line 100, some of the light will be converted to a higher order mode and/or a different polarization (e.g., from TE00 to some or all of TM00, TM10, TE01, and TE10) as it travels through any given bend. This results in higher losses from the photonic passive delay line 100 than would be expected based on propagation losses alone. These different modes and/or polarization states are collectively referred to herein as "parasitic modes," and losses to these parasitic modes within a photonic passive delay line are referred to herein as "parasitic losses."

Within a bend, the amount of light that couples into different parasitic modes increases as a function of waveguide width (i.e., the in-plane thickness of the waveguide) for a given bend radius. Increasing the bend radius of the bends will also increase the size of the passive photonic delay line, and thus a photonic passive delay line may utilize relatively small bends to prioritize a smaller form factor. As a result, a photonic passive delay line may focus on decreasing a width of the waveguide in each bend to reduce the parasitic losses that are generated. Because propagation losses increase with decreasing waveguide width, a corresponding reduction in the width of the straight segments would increase propagation losses in the straight segments. This thereby offsets some or all of the effects of having narrower waveguide bends.

Accordingly, it may be desirable for a photonic passive delay line to be configured such that some or all of the straight segments are wider than the bends. This allows the photonic passive delay line to prioritize reducing different types of loss in different regions (e.g., prioritizing reduction of parasitic losses in the bends and prioritizing the reduction of propagation losses in the straight segments). This may result in lower overall losses when compared to a similarly sized photonic passive delay line having a constant waveguide width across the entire photonic passive delay line.

Figure 1B:
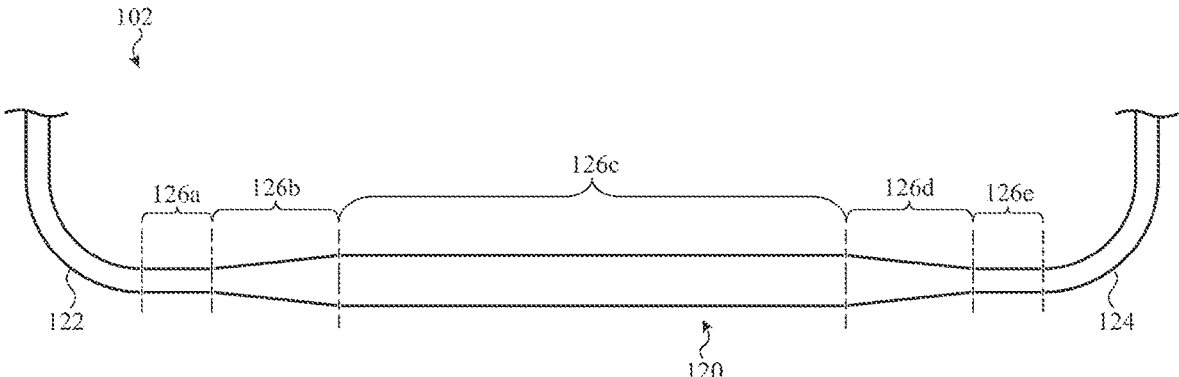
FIG. 1B shows a top view of an example of a single straight segment suitable for use with the photonic passive delay line of FIG. 1A.

For example, FIG. 1B shows a portion of waveguide 102 with an example straight segment 120 between immediately adjacent bends (a first bend 122 and a second bend 124). Straight segment 120, first bend 122, and second bend 124 may represent any corresponding straight segment and corresponding immediately adjacent bends of the photonic passive delay line 100 of FIG. 1. Specifically, the first and second bends 122, 124 are shown there as each having a first width, and the straight segment 120 is divided into multiple regions with different widths.

Specifically, the straight segments include a first end region 126a having the first width, a first transition region 126b with a width that transitions from the first width to a wider second width, an intermediate region 126c having the second width, a second transition region 126d with a width that transitions from the second width to the first width, and a second end region 126e having the first width. The first transition region 126b is positioned between the first end region 126a and the intermediate region 126c, while the second transition region 126d is positioned between the intermediate region 126c and the second end region 126e. The first end region 126a is connected to the first bend 122 and the second end region 126e is connected to the second bend 124. In this way, the straight segment 120 may transition from the first width to the second width and back to the first width across the length of the straight segment 120. This may prioritize mitigating propagation losses in the straight segment 120 while prioritizing mitigating parasitic losses in the first and second bends 122, 124.

Because each straight segment 108a-108j of the photonic passive delay line 100 is positioned between two immediately adjacent bends, some or all of the straight segments 108a-108j may have the first and second width transitions described above with respect to the example straight segment 120 described with respect to FIG. 1B. To further minimize propagation losses in the straight segments 108a-108j of the photonic passive delay line 100, it may be desirable to maximize the length of the wider regions of straight segments 108a-108j (e.g., the intermediate region 126c of straight segment 120) relative to the lengths of the narrower regions thereof (e.g., the first and second end regions 126a, 126e of straight segment 120, as well as the first and second transition regions 126b, 126d). For example, in the variation of the photonic passive delay line 100 shown in FIG. 1A, each of the straight segments 108a-108j may have a first end region, a first transition region, an intermediate region, a second transition region, and a second end region as discussed with respect to the straight segment 120 of FIG. 1B.

The straight segments 108a-108j are further configured such that their first end regions, first transition regions, second transition regions, and second end regions each share corresponding common lengths. In other words, the first end regions of the plurality of straight segments 108a-108j each have the same length (e.g., a first length), the first transition regions of the plurality of straight segments 108a-108j each have the same length (e.g., a second length) the intermediate regions of the plurality of straight segments 108a-108j each have the same length (e.g., a third length), the second transition regions of the plurality of straight segments 108a-108j each have the same length (e.g., a fourth length), and the second end regions of the plurality of straight segments 108a-108j each have the same length (e.g., a fifth length). The different regions of a given straight segment need not have the same length, though in some instances it may be desirable for one or more straight segments to be symmetric, such that the first end region has the same length as the second end region, and the first transition region has the same length as the second transition region.

Figure 1C:
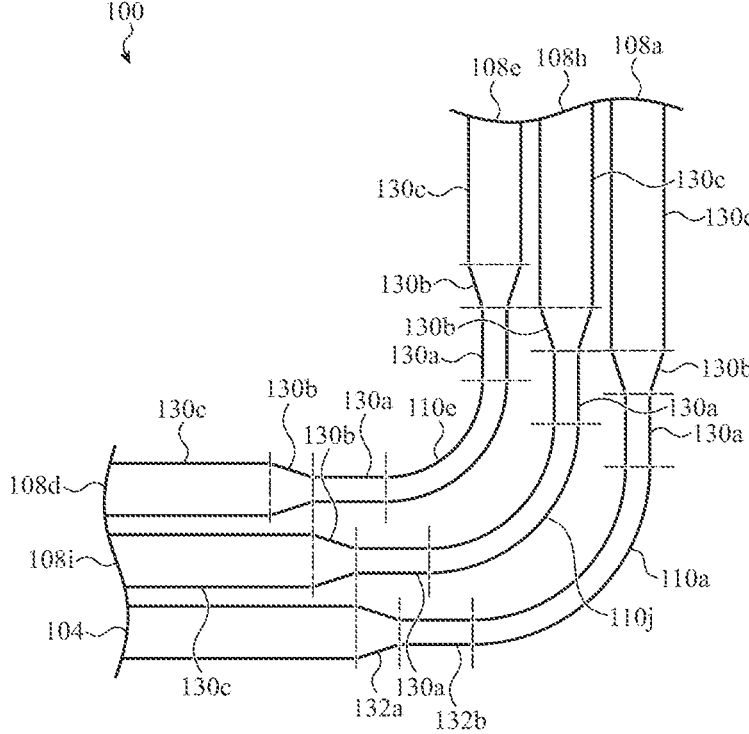
FIG. 1C is a top view of a set of waveguide bends of the photonic passive delay line of FIG. 1A.

To help illustrate this, FIG. 1C is an expanded view of a corner of the photonic passive delay line 100 (as contained within line 1C-1C of FIG. 1A), which includes the first bend 110a, the fifth bend 110e, and the tenth bend 110j. Also shown there are portions of the input segment 104, the first straight segment 108a, the fourth straight segment 108d, the fifth straight segment 108e, the eighth straight segment 108h, and the ninth straight segment 108i. Each of the first bend 110a, the fifth bend 110e, and the tenth bend 110j have a common first width, and the same radius curvature. Each of the straight segments shown in FIG. 1C has an end region 130a attached to a corresponding bend and having the first width, a transition region 130b with a width that transitions from the first width to a wider second width, and an intermediate region 130c that has the second width. In some instances, the input segment 104 may have a transition region 132a that narrows the width of the waveguide toward an end region 132b that connects to the first bend 110a (which allows other parts of the input segment 104 to have a width larger than the first bend 110a).

As shown in FIG. 1C, the end regions 130a of these straight segments all share a first common length, and the transition regions 130b of these straight segments all share a second common length. Because these first and second lengths are fixed, the length of the intermediate region 130c may vary slightly between straight segments to account for changes in the overall length of the straight segments (e.g., the first straight segment 108a is longer than the fifth and eighth straight segments 108e, 108h to accommodate the winding of the waveguide 102). By keeping the end regions 130a at the same length, this may help to minimize the propagation losses in the straight segments while also reducing parasitic losses in the bends. Accordingly, the photonic passive delay line 100 depicted in FIGS. 1A-1C may achieve a compact form factor with relatively low overall loss.

While the variation of the photonic passive delay line 100 described with respect to FIGS. 1A-1C may have relatively low overall loss when used with a single target wavelength or a relatively small range of target wavelengths (e.g., one the order of a handful of nanometers), this performance may not extend across a wider range of target wavelengths. In certain instances, the parasitic coupling in the bends 110a-1101 may be magnified within the photonic passive delay line 100.

Because the bends 110a-1101 each have the same length and radius of curvature, they will each provide a similar amount of coupling between parasitic modes (though it should be appreciated that there may be minor differences resulting from imperfections in the walls of the waveguide 102 in the various bends). When input light having a first mode (hereinafter the "input mode") is introduced into the first bend 110a from the input segment 104, some of the input mode will be coupled into one or more parasitic modes. After the first bend 110a, the input mode and the newly-generated parasitic modes will propagate through the first straight segment 108a. The input mode and each of the parasitic modes have different phase velocities in the waveguide 102, and thus the phase difference between the input mode and each parasitic mode will vary along the length the straight segment 108a. This phase difference is dependent on the parasitic mode, the dimensions of the first straight segment 108a, as well as the wavelength of the input light introduced into the photonic passive delay line 100. Accordingly, for a given parasitic mode and a given wavelength of light, each straight segment will provide a relative phase difference (hereinafter referred to as a "dephasing amount") across its length (i.e., between the connections between the straight segment and its corresponding immediately adjacent bends). The dephasing amount will have a value between zero and 2π, and its value will impact the parasitic mode coupling in the subsequent bend.

For example, if the first straight segment 108a provides a dephasing amount of it for a particular parasitic mode (e.g., TM00) and wavelength, the parasitic mode generated from the first bend 110a will be out of phase with the input mode when the light reaches the second bend 110b. In these instances, the second bend 110b will couple light from the parasitic mode back to the input mode. If subsequent straight segments continue to provide a dephasing amount of it for a particular parasitic mode (e.g., TM00) and wavelength, the amount of light coupled to that parasitic mode remains small throughout the photonic passive delay line.

Conversely, if the first straight segment 108a provides a dephasing amount near 0 or 2π for a particular parasitic mode (e.g., TM00) and wavelength, the parasitic mode generated from the first bend 110a will be in phase with the input mode when the light reaches the second bend 110b. In these instances, the second bend 110b will couple additional light from the input mode to this parasitic mode, which will constructively interfere with the amount of parasitic mode generated in the first bend 110a. If the remaining straight segments of the photonic passive delay line 100 provide the same dephasing amount for that parasitic mode and wavelength, the amount of parasitic loss will be magnified with each bend, thereby increasing the overall loss of the photonic passive delay line 100.

If the photonic passive delay line 100 is designed to operate over a target wavelength range having single target wavelength (i.e., the photonic integrated circuit only routes the single target wavelength to the photonic passive delay line 100), the dimensions of the straight segments 108a-108j may be selected so that they each provide dephasing amounts closer to it for the parasitic modes generated by the bends 110a-1101. As the bandwidth of the target range of wavelengths increases, however, it becomes more likely that the straight segment 108a-108j will each provide a dephasing amount closer to 0 or 2π for at least one combination of a parasitic mode and a wavelength within the target range of wavelengths. For these wavelengths, the photonic passive delay line 100 may experience significantly increased overall losses due to the magnified parasitic mode generation.

The photonic passive delay lines described herein are configured to have improved performance over a wide range of target wavelengths. Specifically, the photonic passive delay lines are configured with straight segments that vary in a manner that provides a range of different dephasing amounts for a given parasitic mode and wavelength. This may provide for distributed dephasing across different parasitic modes and wavelengths, which may reduce average losses to parasitic modes across a target wavelength range.

As mentioned above, the dephasing amount of a given straight segment is dependent on the dimensions of the straight segment, as well as the parasitic mode of interest and the wavelength and input mode of input light. For example, a straight segment of a waveguide having a constant width will have a dephasing length, which represents the length at which the straight segment will achieve a dephasing amount of π for a given parasitic mode and wavelength. The dephasing length $L_{dephase}$ of a straight segment (or a portion thereof) may be calculated using the equation:

$$L_{dephase} = \lambda/(2|n_{IM} - n_{PM}|)$$

where λ is the wavelength of the input light, $n_{IM}$ is the effective refractive index of the waveguide for the input mode, and $n_{PM}$ is the effective refractive index of the waveguide for the parasitic mode at that wavelength.

Figure 2:
FIG. 2 shows an example graph illustrating dephasing lengths for a parasitic mode at different waveguide widths as a function of input light wavelength.
Figure 2:
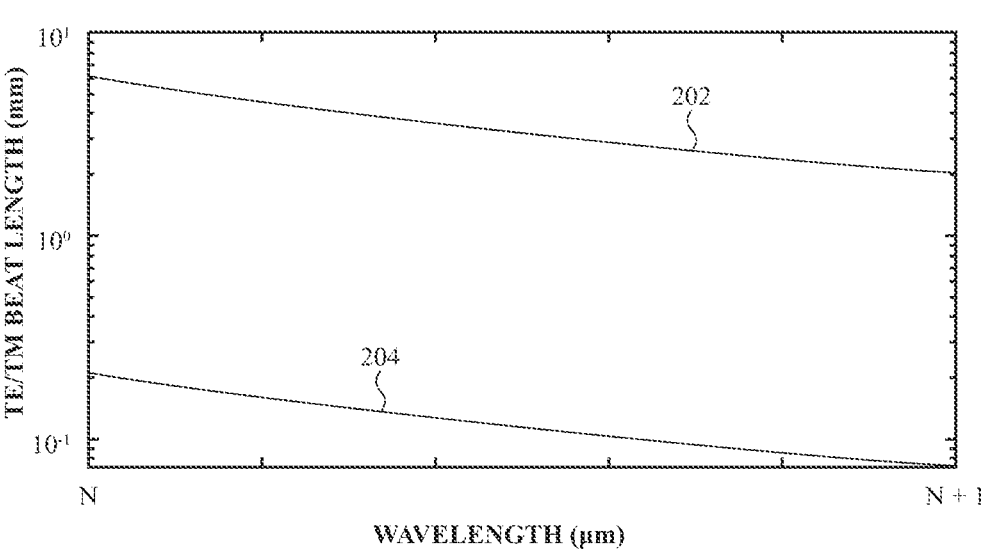

Because the effective refractive index of the waveguide at a given mode is dependent on the waveguide width, the dephasing length for a given parasitic mode and wavelength will also depend on the width of the waveguide. For example, FIG. 2 shows an example graph 200 representing dephasing length as a function of wavelength, where the input mode is light having TE polarization (e.g., TE00) and the parasitic mode is light having TM polarization (e.g., TM00). Specifically, a first plot 202 indicates the dephasing length as a function of wavelength for a waveguide having a first waveguide width. Similarly, a second plot 204 indicates the dephasing length as a function of wavelength for a waveguide having a narrower second waveguide width. The first and second plots 202, 204 are shown across an example bandwidth spanning 1 micron (the boundaries of which are represented by a first wavelength than is N microns and a second wavelength that is N+1 microns). It should be appreciated that graph 200 is depicted for illustration purposes, and is not intended to encompass a particular range of wavelengths or waveguide widths.

Increasing the waveguide width decreases the difference in effective refractive index between the input mode and the parasitic mode for a given wavelength, and thereby increases the dephasing length. Accordingly, for each wavelength shown in FIG. 2, the wider first waveguide width will have a longer dephasing length than the second waveguide width. At wavelength N, for example, a waveguide of the first width has a dephasing length of about 6 mm, while a waveguide having the second width has a dephasing length of about 0.2 mm. In other words, a segment of a waveguide having the first width will need to be 6 mm long in order to provide a dephasing amount of it, whereas a different segment of waveguide having the second width may achieve the same amount of dephasing with a length of 0.2 mm.

As a result, when a straight segment of a photonic passive delay line has multiple regions of different widths, the overall dephasing amount provided by the straight segment depends on the widths and lengths of the individual regions. As used herein, the "effective dephasing length" of a straight segment (or region thereof) is a normalized value (expressed herein as being between 0 and 1) that represents an overall dephasing amount provided by that straight segment (or region thereof) for a given wavelength and parasitic mode. As used herein, an effective dephasing length of 0 means that light of that wavelength traveling through that segment (or region thereof) will experience a dephasing amount of 0 for that parasitic mode. A dephasing length of 1 means that light of that wavelength traveling through that segment (or region thereof) will experience a dephasing amount of $\pi$ for that parasitic mode.

When a straight segment has a constant width, the effective dephasing length of that straight segment (for a given wavelength and parasitic mode) will cycle between 0 and 1 as the length of that straight segment is increased. Specifically, starting from a length of zero (and an effective dephasing length of 0), increasing the length of the straight segment will increase the effective dephasing length until the straight segment reaches its dephasing length, at which point the effective dephasing length is 1. Continuing to increase the length of the straight segment will decrease the effective dephasing length until the straight segment reaches a length that is double the dephasing length, at which point the effective dephasing length has returned to 0. Accordingly, even multiples of the dephasing length will result in an effective dephasing length of 0, whereas odd multiples of the dephasing length will result in an effective dephasing length of 1.

Accordingly, to provide for distributed dephasing across a range of target wavelengths, the photonic passive delay lines described herein may be designed with straight segments that have a range of different effective dephasing lengths for various wavelengths and parasitic modes. This may be achieved in a number of ways, as will be described in more detail with respect to FIGS. 3 and 4A-4C.

Figure 3:
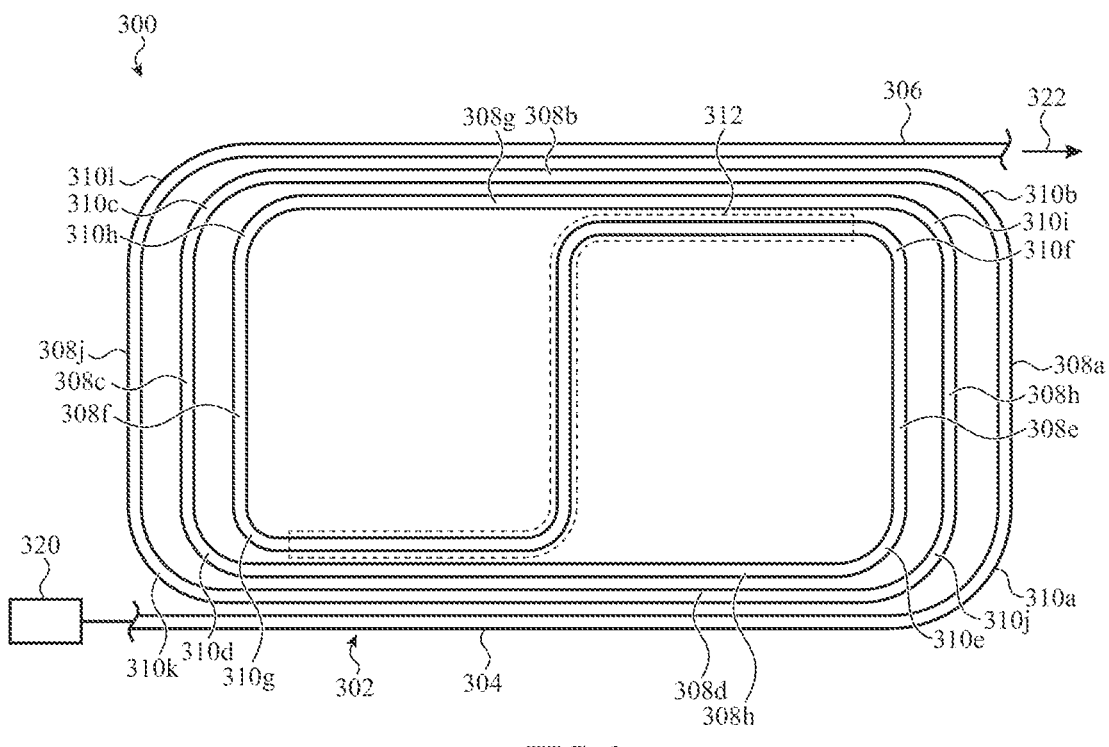
FIG. 3 is a top view of an example of a photonic passive delay line having distributed dephasing as described herein.

For example, FIG. 3 shows a variation of a photonic passive delay line 300 with distributed dephasing of one or more parasitic modes across a target range of input wavelengths. As shown there, the photonic passive delay line 300 is formed from a length of waveguide 302 of a photonic integrated circuit. Specifically, the waveguide 302 includes an input segment 304 and an output segment 306. The input segment 304 may be connected to a light source unit 320 (which may be configured in any manner as described previously), such that input light 322 received at the input segment 304 will be carried through the waveguide 302 and will exit the photonic passive delay line via the output segment 306. Between the input segment 304 and the output segment 306, the waveguide 302 is wound into a spiral having a plurality of straight segments 308a-308j and a plurality of bends 310a-3101 (each formed by a corresponding portion of the waveguide 302). Each straight segment of the plurality of straight segments 308a-308j is positioned between a corresponding pair of immediately adjacent bends of the plurality of bends 310a-3101. The variation shown in FIG. 3 includes ten straight segments 308a-308j and twelve bends 310a-3101, though it should be appreciated that the photonic passive delay line 300 may include any suitable number of bends and straight segments depending on the length of the waveguide 302 and the overall area into which the waveguide 302 is wound.

In the middle of the photonic passive delay line 300 is a turn segment 312 that allows the waveguide to change direction. The photonic passive delay line winds counterclockwise between the input segment 304 and the turn segment 312 (via a first set of the bends and straight segments) and winds clockwise between the turn segment 312 and the output segment 306 (via a first set of the bends and straight segments), though it should be appreciated that the direction of winding may be reversed. Specifically, in the variation shown in FIG. 3, the first through fifth straight segments 308a-308e and the first through sixth bends 310a-310f (collectively forming the first set of bends and straight segments) connect the input segment 304 to the turn segment 312 along the length of the waveguide 302. Similarly, the sixth through tenth straight segments 308f-308j and the seventh through twelfth bends 310g-3101 (collectively forming the second set of bends and straight segments) connect the turn segment 312 to the output segment 306 along the length of the waveguide.

Certain aspects of some or all of the straight segments 308a-308j may be varied to adjust the relative effective dephasing lengths of the straight segments 308a-308j for a given wavelength and parasitic mode. For example, different straight segments may have different lengths and/or widths, which may result in these straight segments having different effective dephasing lengths. In some instances, this may cause the spacing to vary between straight segments on a given side of the spiral. For example, in the variation shown in FIG. 3, the eighth straight segment 308h is positioned closer to the fifth straight segment 308e than it is to the first straight segment 308a.

In some instances, some or all of the straight segments 308*a*-308*j* may have regions with different widths. The photonic passive delay line 300 may include a plurality of the straight segments, each of which includes a first set of regions having a first waveguide width and a second set of regions having a second waveguide width larger than the first waveguide width. The first and second waveguide widths may be any suitable values depending on the requirements of the photonic passive delay line 300. In some variations, the first waveguide width is less than 2 microns, and the second waveguide width is greater than 2 microns. Because the narrower regions of the straight segments have shorter dephasing lengths, adjusting the lengths of these segments may have a larger impact in determining the effective dephasing length of a straight segment, as will be described in more detail with respect to FIGS. 4A-4C. Additionally, in some instances the bend radii of different bends of the plurality of bends 310*a*-310*l* may be varied to alter how light is coupled to parasitic modes in these bends.

These characteristics of the straight segments 308*a*-308*j* may be varied so that these straight segments 308*a*-308*j* provide a range of dephasing amounts for multiple wavelengths of light across a target range of wavelengths. In some variations, the light source unit 320 is configured to generate light ("output light") at a set of wavelengths in a target wavelength range. The set of wavelengths includes at least a maximum wavelength of the target wavelength range and a minimum wavelength of the target wavelength range. The photonic passive delay line 300 receives this output light as input light having an input mode.

As a result, the photonic passive delay line 300 will receive, during operation of an optical system that incorporates the light source unit 320 and the photonic passive delay line 300, input light at each of the set of wavelengths in the target wavelength range. Accordingly, it may be desirable to reduce the parasitic losses at each of these wavelengths. It should be appreciated that the photonic passive delay line 300 does not necessarily receive these wavelengths simultaneously, but instead may receive different wavelengths at different times, depending on the operation of the optical system.

A plurality of straight segments of the photonic passive delay line 300 may be configured such that, for each wavelength in the set of wavelengths, the plurality of straight segments has a distribution of effective dephasing lengths for a parasitic mode that spans at least a threshold amount of effective dephasing length. In these instances, for a given wavelength in the set of wavelengths (e.g., the minimum wavelength), each of these straight segments will have a corresponding effective dephasing length for the parasitic mode. Collectively, the straight segments will have a distribution of effective dephasing lengths for a given wavelength and parasitic mode. The difference between the largest and smallest effective dephasing lengths of the distribution will determine the span of that distribution. For example, if four straight segments have effective dephasing lengths of 0.2, 0.5, 0.6, and 1.0, respectively, for the minimum wavelength and the parasitic mode, these straight segments span 0.8 effective dephasing lengths.

In some variations the threshold amount is 0.3 effective dephasing lengths. In other variations, the threshold amount is 0.5 effective dephasing lengths. The plurality of straight segments may be configured to meet this distribution criteria for a single parasitic mode, or may be configured to meet this distribution criteria for multiple parasitic modes. For example, if the threshold amount is 0.3 effective dephasing lengths, the plurality of straight segments may be configured such that, for each wavelength in the set of wavelengths, the straight segments have a distribution of effective dephasing lengths for a first parasitic mode that spans at least 0.3 effective dephasing lengths. In some of these variations, the plurality of straight segments is configured such that, for each wavelength in the set of wavelengths, the straight segments have a distribution of effective dephasing lengths for a second parasitic mode that also spans at least 0.3 effective dephasing lengths.

Each parasitic mode may be any suitable parasitic mode as described previously. In some variations, the input mode and the parasitic mode may have different polarizations. For example, the input mode may have a first polarization direction (e.g., TE polarization), while the parasitic mode has a second polarization direction perpendicular to the first polarization direction (e.g., TM polarization). Additionally or alternatively, the input mode and the parasitic mode may have different mode orders. For example, the input mode may be a fundamental mode (e.g., TE00), while the parasitic mode is a higher-order mode (e.g., TE01, TE10, TE02, TM01, or the like).

The target wavelength range may span any suitable range of wavelengths depending on the needs of the optical system. For example, in some variations the target wavelength range spans at least 100 microns (i.e., the maximum wavelength and the minimum wavelength span at least 100 nanometers). In some of these variations, the target wavelength range spans at least 500 microns (i.e., the maximum wavelength and the minimum wavelength span at least 500 nanometers). In some of these variations, the target wavelength range spans at least 1000 microns (i.e., the maximum wavelength and the minimum wavelength span at least 1000 nanometers).

In some instances, the set of wavelengths may be a subset of the wavelengths in the target wavelength range. In these instances, the configuration of the straight segments may be selected to prioritize minimizing parasitic losses at these wavelengths. In other instances, depending on the set of wavelengths, it may be desirable to configure the straight segments to reduce parasitic losses across the entire range of target wavelengths. For example, in some variations the plurality of straight segments of the photonic passive delay line 300 may be configured such that, for each wavelength in the target range of wavelengths, the plurality of straight segments has a distribution of effective dephasing lengths for a parasitic mode (or for each of multiple parasitic modes) that spans at least the threshold amount of effective dephasing lengths as discussed above (e.g., at least 0.3 effective dephasing lengths, at least 0.5 effective dephasing lengths).

In some embodiments of the photonic passive delay lines described herein, it may be desirable to configure the photonic passive delay line such that pairs of immediately adjacent straight segments provide different dephasing amounts across a range of target wavelengths. Specifically, the photonic passive delay line (e.g., photonic passive delay line 300) may be configured to operate across a target wavelength range, such that the photonic passive delay line receives input light having an input mode and an input wavelength within the target wavelength range. This input light may be generated using a light source unit such as described previously.

The photonic passive delay line may be configured in any manner as described with respect to photonic passive delay line 300 of FIG. 3, but in these embodiments a plurality of the straight segments (e.g., some or all of the straight segments 308*a*-308*j*) are configured such that, for each wavelength within the target range of wavelengths and a parasitic mode, at least one pair of immediately adjacent straight segments of the plurality of straight segments has an effective dephasing length change that is greater than a threshold amount of effective dephasing lengths. The effective dephasing length change is the difference between the effective dephasing length of a first straight segment and the effective dephasing length of a second, immediately adjacent, straight segment. For example, if the first straight segment has an effective dephasing length of 0.2 and the second straight segment has an effective dephasing length of 0.7, the effective dephasing length change for that pair is 0.5 effective dephasing lengths.

In some variations, this threshold amount is 0.4 effective dephasing lengths. Accordingly, the plurality of straight segments is configured such that, for each wavelength within the target range of wavelengths and a parasitic mode, at least one pair of immediately adjacent straight segments of the plurality of straight segments has an effective dephasing length change that is greater than 0.4 effective dephasing lengths. In other variations, the threshold amount is 0.5 effective dephasing lengths, such that for each of these wavelengths and the parasitic mode, at least one pair of immediately adjacent straight segments of the plurality of straight segments has an effective dephasing length change that is greater than 0.5 effective dephasing lengths.

As described above, the parasitic mode may be any suitable parasitic mode as described. In some variations, the input mode and the parasitic mode may have different polarizations. For example, the input mode may have a first polarization direction (e.g., TE polarization), while the parasitic mode has a second polarization direction perpendicular to the first polarization direction (e.g., TM polarization). Additionally or alternatively, the input mode and the parasitic mode may have different mode orders. For example, the input mode may be a fundamental mode (e.g., TE00), while the parasitic mode is a higher-order mode (e.g., TE01, TE10, TE02, TM01, or the like).

It should be appreciated that the plurality of straight segments may, in some variations, be configured to meet the threshold amount of effective dephasing length change for multiple parasitic modes. For example, the plurality of straight segments is configured such that, for each wavelength within the target range of wavelengths and a first parasitic mode, at least one pair of immediately adjacent straight segments of the plurality of straight segments has an effective dephasing length change that is greater than a threshold amount of effective dephasing lengths (e.g., greater than 0.4 effective dephasing lengths, greater than 0.5 effective dephasing lengths, or the like). The plurality of straight segments may be further configured such that, for each wavelength within the target range of wavelengths and a second parasitic mode, at least one pair of immediately adjacent straight segments of the plurality of straight segments has an effective dephasing length change that is greater than the threshold amount of effective dephasing lengths.

In embodiments where the plurality of straight segments is configured to meet these dephasing length changes as discussed immediately above, the target wavelength range may span any suitable range of wavelengths depending on the desired operating range of the photonic passive delay line (which in turn may depend on the needs of the optical system incorporating the photonic passive delay line). For example, in some variations the target wavelength range spans at least 100 microns. In some of these variations, the target wavelength range spans at least 500 microns. In some of these variations, the target wavelength range spans at least 1000 microns.

Figure 4A:
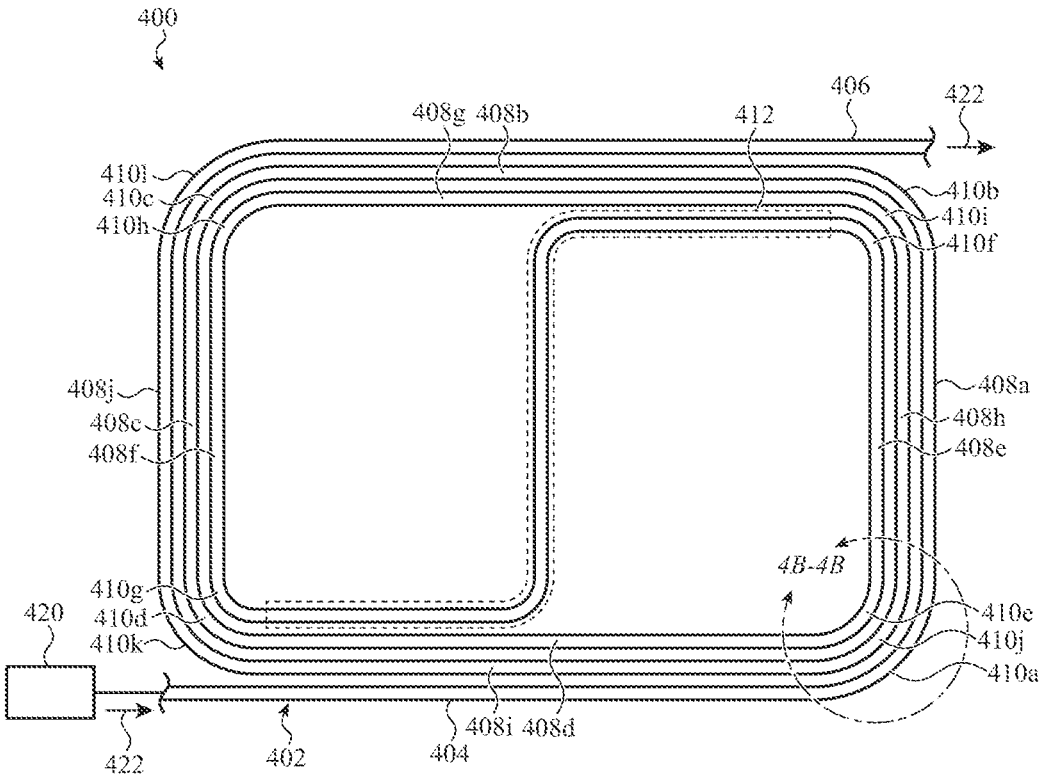
FIG. 4A is a top view of an example of a photonic passive delay line having distributed dephasing as described herein.

In some variations of the photonic passive delay lines described here, the photonic passive delay line may include straight segments having multiple regions of different widths. In these variations, narrower regions of these straight segments may be varied to provide the distributed dephasing as discussed above with respect to the photonic passive delay line 300 of FIG. 3. FIG. 4A shows one such variation of a photonic passive delay line 400. As shown there, the photonic passive delay line 400 is formed from a length of waveguide 402 defined in a photonic integrated circuit. Specifically, the waveguide 402 includes an input segment 404 and an output segment 406. The input segment 404 may be connected to a light source unit 420 (which may be configured in any manner as described previously), such that input light 422 received at the input segment 404 will be carried through the waveguide 402 and will exit the photonic passive delay line via the output segment 406. Between the input segment 404 and the output segment 406, the waveguide 402 is wound into a spiral having a plurality of straight segments 408a-408j and a plurality of bends 410a-4101 (each formed by a corresponding portion of the waveguide 402). Each straight segment of the plurality of straight segments 408a-408j is positioned between a corresponding pair of immediately adjacent bends of the plurality of bends 410a-4101. The variation shown in FIG. 3 includes ten straight segments 408a-408j and twelve bends 410a-4101, though it should be appreciated that the photonic passive delay line 400 may include any suitable number of bends and straight segments depending on the length of the waveguide 402 and the overall area into which the waveguide 402 is wound.

In the middle of the photonic passive delay line 400 is a turn segment 412 that allows the waveguide to change direction. The photonic passive delay line winds counter-clockwise between the input segment 404 and the turn segment 412 (via a first set of the bends and straight segments) and winds clockwise between the turn segment 412 and the output segment 406 (via a first set of the bends and straight segments), though it should be appreciated that the direction of winding may be reversed. Specifically, in the variation shown in FIG. 4, the first through fifth straight segments 408a-408e and the first through sixth bends 410a-410f (collectively forming the first set of bends and straight segments) connect the input segment 404 to the turn segment 412 along the length of the waveguide 402. Similarly, the sixth through tenth straight segments 408f-408j and the seventh through twelfth bends 410g-4101 (collectively forming the second set of bends and straight segments) connect the turn segment 412 to the output segment 406 along the length of the waveguide.

In the variation shown in FIG. 4, a plurality of the straight segments (which may be some or all of the straight segments 408a-408j of the photonic passive delay line 400) are configured such that each straight segment has a first set of regions having a first aggregate length and a first waveguide width and a second set of regions having a second aggregate length and a second waveguide width larger than the first waveguide width. Specifically, the "aggregate length" for a set of regions is the sum of the lengths for each region of the set of regions. For example, if a given straight segment is configured in the same manner of straight segment 120 described above with respect to FIG. 1B, the first and second end regions (e.g., first and second end regions 126a, 126b) would collectively form the first set of regions having the first width. In this instance, the first aggregate length is the sum of the lengths of the first and second end regions. Similarly, the intermediate region (e.g., intermediate region 126c), as the only region having the second width, forms the second set of regions. In this instance, the second aggregate length is the length of the intermediate region. In some variations, the first waveguide width is less than 2 microns, and the second waveguide width is greater than 2 microns. Accordingly, each of the plurality of straight segments has a corresponding first aggregate length and a corresponding second aggregate length.

Figure 4B:
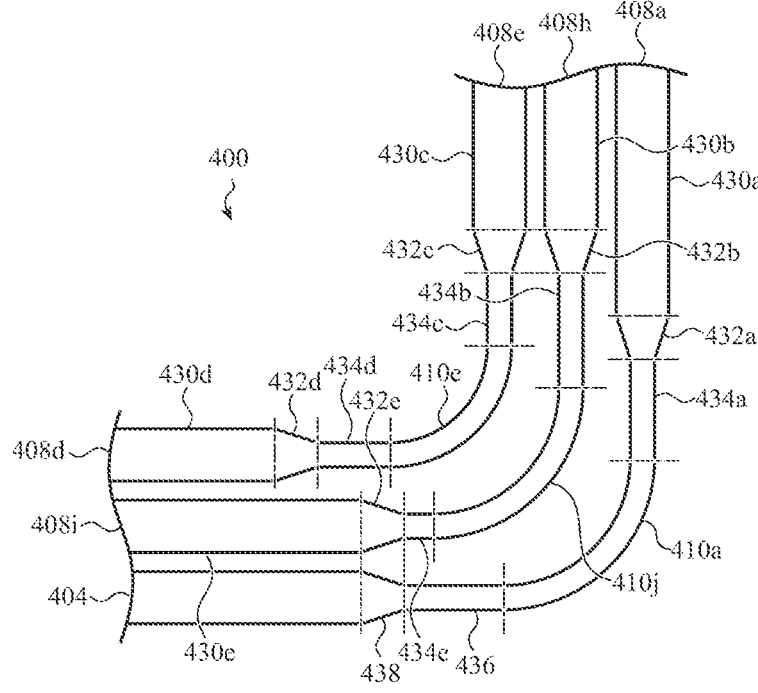
FIG. 4B is a top view of a set of waveguide bends of the photonic passive delay line of FIG. 4A.

The photonic passive delay line 400 may be configured such that each of the plurality of straight segments has a different corresponding first aggregate length. In this way, the first aggregate length of each straight segment of the plurality of straight segments is different from the first aggregate lengths of the other straight segments of the plurality of straight segments (i.e., each straight segment of the plurality of straight segments has a unique first aggregate length). For example, FIG. 4B shows an expanded view of a corner of the photonic passive delay line 400 (as contained within line 4B-4B of FIG. 4A), which includes the first bend 410a, the fifth bend 410e, and the tenth bend 410j. Also shown there are portions of the input segment 404, the first straight segment 408a, the fourth straight segment 408d, the fifth straight segment 408e, the eighth straight segment 408h, and the ninth straight segment 408i. Each of the first bend 410a, the fifth bend 410e, and the tenth bend 410j have a common first width, and the same radius curvature.

Figure 4C:
FIG. 4C is a top view of an example of a variation of a straight segment suitable for use with the photonic passive delay line of FIG. 4A.
Figure 4C:
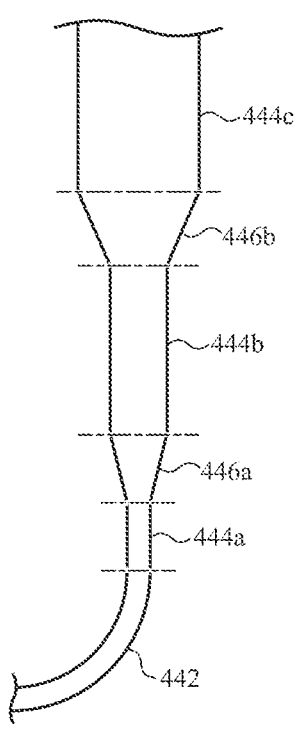

Each of the straight segments shown in FIGS. 4B and 4C has an end region attached to a corresponding bend and having the first width, a transition region with a width that transitions from the first width to a wider second width, and an intermediate region that has the second width. Specifically, the first straight segment 408a has an end region 434a, a transition region 432a, and an intermediate region 430a, the eighth straight segment 408h has an end region 434b, a transition region 432b, and an intermediate region 430b, and the fifth straight segment 408e has an end region 434c, a transition region 432c, and an intermediate region 430c. Similarly, the fourth straight segment 408d has an end region 434d, a transition region 432d, and an intermediate region 430d, and the ninth straight segment 408i has an end region 434e, a transition region 432e, and an intermediate region 430e. It should be appreciated that each of these straight segments may have a second end region and transition region on an opposite side of its corresponding intermediate region. Additionally, the input segment 404 may have a transition region 438 that narrows the width of the waveguide toward an end region 436 that connects to the first bend 410a (which allows the other part of the input segment 404 to have a width larger than the first bend 410a).

Unlike the photonic passive delay line 100 of FIGS. 1A-1C (in which the end regions of the straight segments all share a common length), some or all of the end regions 434a-434e have different lengths. For example, the end region 434a of the first straight segment 408a depicted in FIG. 4C is shorter than the end segment 434b of the eighth straight segment 408h and is longer than each of the end segments 434c-434e of the remaining straight segments. Accordingly the end region 434a of the first straight segment may have a different effective dephasing length (and may thereby provide a different dephasing amount) as compared to the other first end regions 434b-434e. Similarly, the lengths of some or of all the second end regions of these straight segments may be different.

By varying the first aggregate length between straight segments, the photonic passive delay line 400 may provide for distributed dephasing across a target range of wavelengths. As mentioned above with respect to FIGS. 1A-1C, it is desirable to maximize the width of the straight segments, as well as the relative length of the wider regions (e.g., the intermediate region 126c of straight segment 120 described previously) compared to the narrower regions (e.g., the first and second end regions 126a, 126b) for the purpose of reducing propagation losses. However, increasing the width of a region of the waveguide may significantly increase its dephasing length. For example, in instances where the second waveguide width is larger than two microns, the dephasing length for certain wavelengths may be on the order of several millimeters. This may be significantly longer than the total length of a given straight segment, such that the second aggregate length does not meaningfully contribute to the dephasing amount provided by a given straight segment. Similarly, changes to the second aggregate length between different straight segments may not create a meaningful effective dephasing length change without significantly increasing the overall size of the photonic passive delay line.

Conversely, the narrower regions of the waveguide will have a relatively larger impact on the effective dephasing length of a given straight segment. Similarly, changing the first aggregate length by a particular amount will impart a larger effective dephasing length change as compared to a similar length change in the second aggregate length. Accordingly, changing the first aggregate length between different straight segments may be more effective in distributing dephasing across a range of wavelengths as compared to instances where the first aggregate length remains the same between different straight segments (such as discussed with respect to the photonic passive delay line 100 of FIGS. 1A-1C).

In some instances, every straight segment of a photonic passive delay line (e.g., each of (i.e., all of straight segments 408a-408j of the photonic passive delay line 400) has a unique first aggregate length. In other instances, only a subset of the straight segments of a photonic passive delay line has different corresponding first aggregate lengths. In these instances, there may be two or more straight segments that have the same corresponding first aggregate lengths. Multiple straight segments between the input segment and the turn segment (e.g., some or all of the first through fifth straight segments 408a-408e of photonic passive delay line 400) may have different corresponding first aggregate lengths. Additionally or alternatively, multiple straight segments between the turn segment and the output segment (e.g., some or all of the sixth through tenth straight segments 408f-408i of photonic passive delay line 400) may have different corresponding first aggregate lengths.

The number of straight segments having different first aggregate lengths, as well as the relative values of these first aggregate lengths, may be selected at least in part based on the target range of wavelengths across which the photonic passive delay line 400 is expected to operate. For example, it may be desirable to select these first aggregate lengths to achieve one or more of the distribution criteria described above with respect to the photonic passive delay line 300 of FIG. 3. Specifically, the photonic passive delay line is configured to receive input light having an input mode and an input wavelength within a target wavelength range such as described previously. In some variations, the plurality of straight segments of the photonic passive delay line 400 may be configured such that, for a parasitic mode and each wavelength (or in other variations, for each of a set of wavelengths) within the target range of wavelengths, at least one pair of immediately adjacent straight segments of the plurality of straight segments has a first aggregate length change that is greater than a threshold amount of effective dephasing lengths. In some variations, the threshold amount is 0.4 effective dephasing lengths. In other variations, the threshold amount is 0.5 effective dephasing lengths.

Additionally or alternatively, the plurality of straight segments mentioned above may be configured such that, for each wavelength (or in other variations, for each of a set of wavelengths) within the target range of wavelengths and a parasitic mode, the plurality of straight segments has a distribution of first aggregate lengths that spans at least a threshold amount of effective dephasing lengths. In some variations, the threshold amount is 0.3 effective dephasing lengths. In other variations, the threshold amount is 0.5 effective dephasing lengths.

As described above, the parasitic mode may be any suitable parasitic mode as described. In some variations, the input mode and the parasitic mode may have different polarizations. For example, the input mode may have a first polarization direction (e.g., TE polarization), while the parasitic mode has a second polarization direction perpendicular to the first polarization direction (e.g., TM polarization). Additionally or alternatively, the input mode and the parasitic mode may have different mode orders. For example, the input mode may be a fundamental mode (e.g., TE00), while the parasitic mode is a higher-order mode (e.g., TE01, TE10, TE02, TM01, or the like). It should be appreciated that the plurality of straight segments may, in some variations, be configured to meet any of these criteria for multiple parasitic modes.

The target wavelength range of the photonic passive delay line 400 may span any suitable range of wavelengths depending on the desired operating range of the photonic passive delay line (which in turn may depend on the needs of the optical system incorporating the photonic passive delay line). For example, in some variations the target wavelength range spans at least 100 microns. In some of these variations, the target wavelength range spans at least 500 microns. In some of these variations, the target wavelength range spans at least 1000 microns.

It should also be appreciated that when a plurality of straight segments also includes a transition region with a width that changes from the first width to the second width, the aggregate lengths of these transition regions may also vary between different straight segments, which may help with distributed dephasing as discussed above. Additionally, it may be possible for a given straight segment to have additional regions with waveguide widths larger than the first and second widths described previously. For example, FIG. 4C shows an example of a portion of a straight segment 440 connected to a bend 442. As shown there, the straight segment 440 includes an end region 444a having a first width, a first intermediate region 444b having a second width larger than the first width, and a second intermediate region 444c having a third width greater than the second width. The straight segment 440 further includes a first transition region 446a with a width that changes from the first width to the second width, and a second transition region 446b with a width that changes from the second width to the third width. In these instances, the lengths of these regions may be changed relative to corresponding regions of other straight segments as discussed above to adjust the effective dephasing length of the straight segment.

Figure 5A:
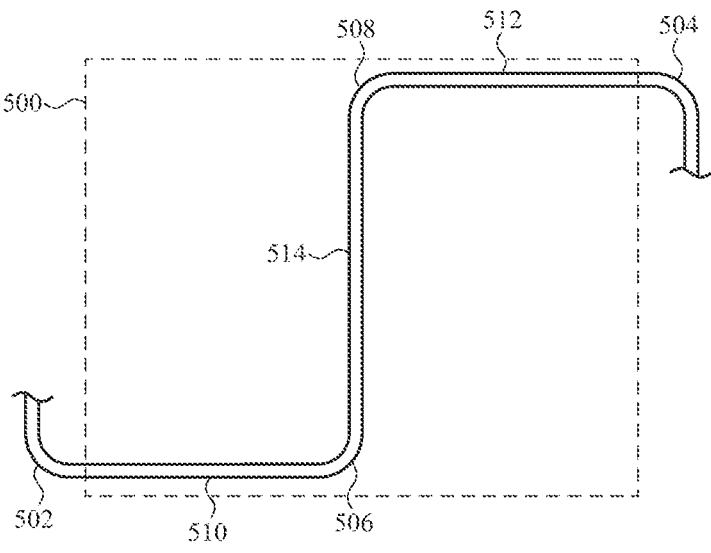
FIGS. 5A and 5B show top views of example waveguide turn segments suitable for use with the photonic passive delay lines described herein.
Figure 5B:
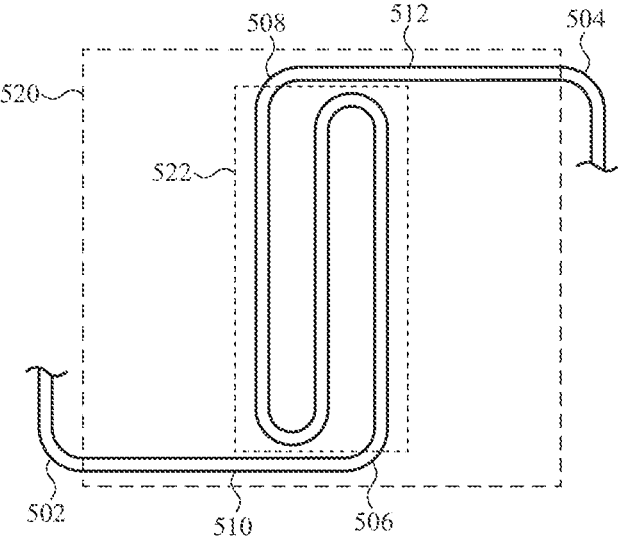

FIGS. 5A and 5B show two examples of turn segments that may be used to change winding directions of the waveguides of the photonic passive delay lines described herein. FIG. 5A shows a turn segment 500, which connects a first bend 502 to a second bend 504. The turn segment includes two bends 506 and 508 that have opposite bending directions. Assuming bend 502 connects the turn segment 500 to an input segment (not shown), a first bend 506 of the turn segment 500 bends the waveguide counterclockwise while the second bend 508 of the turn segment bends the waveguide clockwise. Collectively the first and second bends 506, 508 change the direction of winding of the waveguide. In some variations, the first and second bends 506, 508 form a single continuous curve between bends 502 and 504. In the variation shown in FIG. 5A, the turn segment 500 includes a first partial straight segment 510 that extends partially across the photonic passive delay line to connect the first bend 502 to the bend 506 of the turn segment 500. Similarly, the turn segment 500 includes a second partial straight segment 512 that extends partially across the photonic passive delay line to connect the second bend 504 to the bend 508 of the turn segment 500.

In the variation shown in FIG. 5A, the turn segment 500 includes a straight segment 514 connecting the bends 506, 508. In this way, bends 506, 508 are immediately adjacent. FIG. 5B shows another variation of turn segment 520, which is configured identically to turn segment 500 except that the bends 506, 508 are connected by a serpentine region 522. In these instances, the bends 506, 508 are not immediately adjacent.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A photonic integrated circuit comprising:
a photonic passive delay line configured to receive input light having an input mode and an input wavelength within a target wavelength range, the photonic passive delay line comprising:
a waveguide comprising:
an input segment;
an output segment;
a plurality of bends positioned between the input segment and the output segment along a length of the waveguide; and
a plurality of straight segments positioned between the input segment and the output segment along the length of the waveguide, wherein:
each straight segment of the plurality of straight segments is positioned between a corresponding pair of bends of the plurality of bends;
each straight segment of the plurality of straight segments comprises:
a first set of regions having a first aggregate length and a first waveguide width; and a second set of regions having a second aggregate length and a second waveguide width larger than the first waveguide width; and the first aggregate length of each straight segment of the plurality of straight segments is different and configured to dephase a parasitic mode.

2. The photonic integrated circuit of claim 1, wherein:

the waveguide comprises a turn segment that changes a winding direction of the waveguide and is positioned between the input segment and the output segment along the length of the waveguide.

3. The photonic integrated circuit of claim 2, wherein:

the plurality of straight segments is positioned between the input segment and the turn segment.

4. The photonic integrated circuit of claim 1, wherein:

for each straight segment of the plurality of straight segments:

the first set of regions comprises:

a first end region connected to a first corresponding bend; and a second end region connected to a second corresponding bend immediately adjacent the first corresponding bend; and the second set of regions comprises an intermediate region positioned between the first end region and the second end region along the length of the waveguide.

5. The photonic integrated circuit of claim 1, wherein:

the first waveguide width is less than 2 microns; and the second waveguide width is greater than 2 microns.

6. The photonic integrated circuit of claim 1, wherein:

the plurality of straight segments is configured such that, for each wavelength within the target wavelength range and a parasitic mode:

at least one pair of immediately adjacent straight segments of the plurality of straight segments has a first aggregate length change that is greater than 0.4 effective dephasing lengths.

7. The photonic integrated circuit of claim 6, wherein:

the target wavelength range spans at least 500 nanometers.

8. The photonic integrated circuit of claim 6, wherein:

the input mode has a first polarization direction; and the parasitic mode has a second polarization direction perpendicular to the first polarization direction.

9. An optical system comprising:

a light source unit configured to generate output light at a set of wavelengths in a target wavelength range; the set of wavelengths includes a maximum wavelength of the target wavelength range and a minimum wavelength of the target wavelength range; and a photonic integrated circuit comprising a photonic passive delay line; wherein:

the photonic passive delay line is optically connected to the light source unit to receive the output light as input light having an input mode;

the photonic passive delay line comprises:

a waveguide comprising:

an input segment;

an output segment;

a plurality of bends positioned between the input segment and the output segment along a length of the waveguide; and a plurality of straight segments positioned between the input segment and the output segment along the length of the waveguide such that each straight segment of the plurality of straight segments is positioned between a corresponding pair of bends of the plurality of bends; and the plurality of straight segments is configured such that, for each wavelength in the set of wavelengths, the plurality of straight segments has a distribution of effective dephasing lengths for a parasitic mode that spans at least 0.3 effective dephasing lengths.

10. The optical system of claim 9, wherein:

the light source unit is integrated into the photonic integrated circuit.

11. The optical system of claim 9, wherein:

the input mode has a first polarization direction; and the parasitic mode has a second polarization direction perpendicular to the first polarization direction.

12. The optical system of claim 9, wherein:

the maximum wavelength and the minimum wavelength span at least 500 nanometers.

13. The optical system of claim 12, wherein:

the maximum wavelength and the minimum wavelength span at least 1000 nanometers.

14. The optical system of claim 9, wherein:

each straight segment of the plurality of straight segments comprises:

a first set of regions having a first waveguide width; and a second set of regions having a second waveguide width larger than the first waveguide width.

15. The optical system of claim 14, wherein:

the first waveguide width is less than 2 microns; and the second waveguide width is greater than 2 microns.

16. A photonic integrated circuit comprising:

a photonic passive delay line configured to receive input light having an input mode and an input wavelength within a target wavelength range, the photonic passive delay line comprising:

a waveguide comprising:

an input segment;

an output segment;

a plurality of bends positioned between the input segment and the output segment along a length of the waveguide; and a plurality of straight segments positioned between the input segment and the output segment along the length of the waveguide such that each straight segment of the plurality of straight segments is positioned between a corresponding pair of bends of the plurality of bends; wherein:

the plurality of straight segments is configured such that, for each wavelength within the target wavelength range and a parasitic mode, at least one pair of immediately adjacent straight segments of the plurality of straight segments has an effective dephasing length change that is greater than 0.4 effective dephasing lengths.

17. The photonic integrated circuit of claim 16, wherein:

the target wavelength range spans at least 500 nanometers.

18. The photonic integrated circuit of claim 17, wherein:

the target wavelength range spans at least 1000 nanometers.

19. The photonic integrated circuit of claim 16, wherein:

the input mode has a first polarization direction; and the parasitic mode has a second polarization direction perpendicular to the first polarization direction.

20. The photonic integrated circuit of claim 16, wherein:

the waveguide comprises a turn segment that changes a winding direction of the waveguide and is positioned between the input segment and the output segment along the length of the waveguide.

* * * * *